United States Patent

Quist et al.

[15] 3,643,929
[45] Feb. 22, 1972

[54] APPARATUS FOR THE PREPARATION OF AGGLOMERATES

[72] Inventors: Bernardus B. Quist; Jacobus A. J. Smit, both of Amsterdam, Netherlands

[73] Assignee: Shell Oil Company, New York, N.Y.

[22] Filed: Feb. 24, 1970

[21] Appl. No.: 13,461

[30] Foreign Application Priority Data

Feb. 26, 1969 Netherlands..........................6902962

[52] U.S. Cl................................................................259/9
[51] Int. Cl. ........................................................B01f 7/04
[58] Field of Search.......................259/9, 10, 45, 46, 25, 26, 259/178, 5, 6, 21, 22, 109, 110, 104, 8, 7

[56] References Cited

UNITED STATES PATENTS

| | | | |
|---|---|---|---|
| 3,222,141 | 12/1965 | Donaldson | 259/8 |
| 2,029,690 | 2/1936 | Wilson | 259/9 |
| 2,576,995 | 12/1951 | Carvel | 259/9 |
| 3,536,300 | 10/1970 | Ainsworth | 259/9 |

*Primary Examiner*—Robert W. Jenkins
*Attorney*—Louis J. Bovasso and J. H. McCarthy

[57] ABSTRACT

Apparatus for the preparation of agglomerates of one or more solid substances from a suspension thereof in a liquid with a density lower than that of the agglomerates. The apparatus includes an oblong, substantially cylindrical vessel which is provided near one of the ends with a supply for the suspension of the solid substances, and, if desired, with a supply for one or more auxiliary substances, near the opposite end, with a discharge for liquid and agglomerates. A stirring device consisting of a rotatable shaft is provided in the vessel which is in a coaxial position thereto and to which a number of stirring elements are attached. An annular baffle is disposed in the proximity of at least one, but at most half of the total number of those stirring elements, and on the downstream side thereof, perpendicular to the centerline of the vessel and fastened to the wall thereof.

5 Claims, 6 Drawing Figures

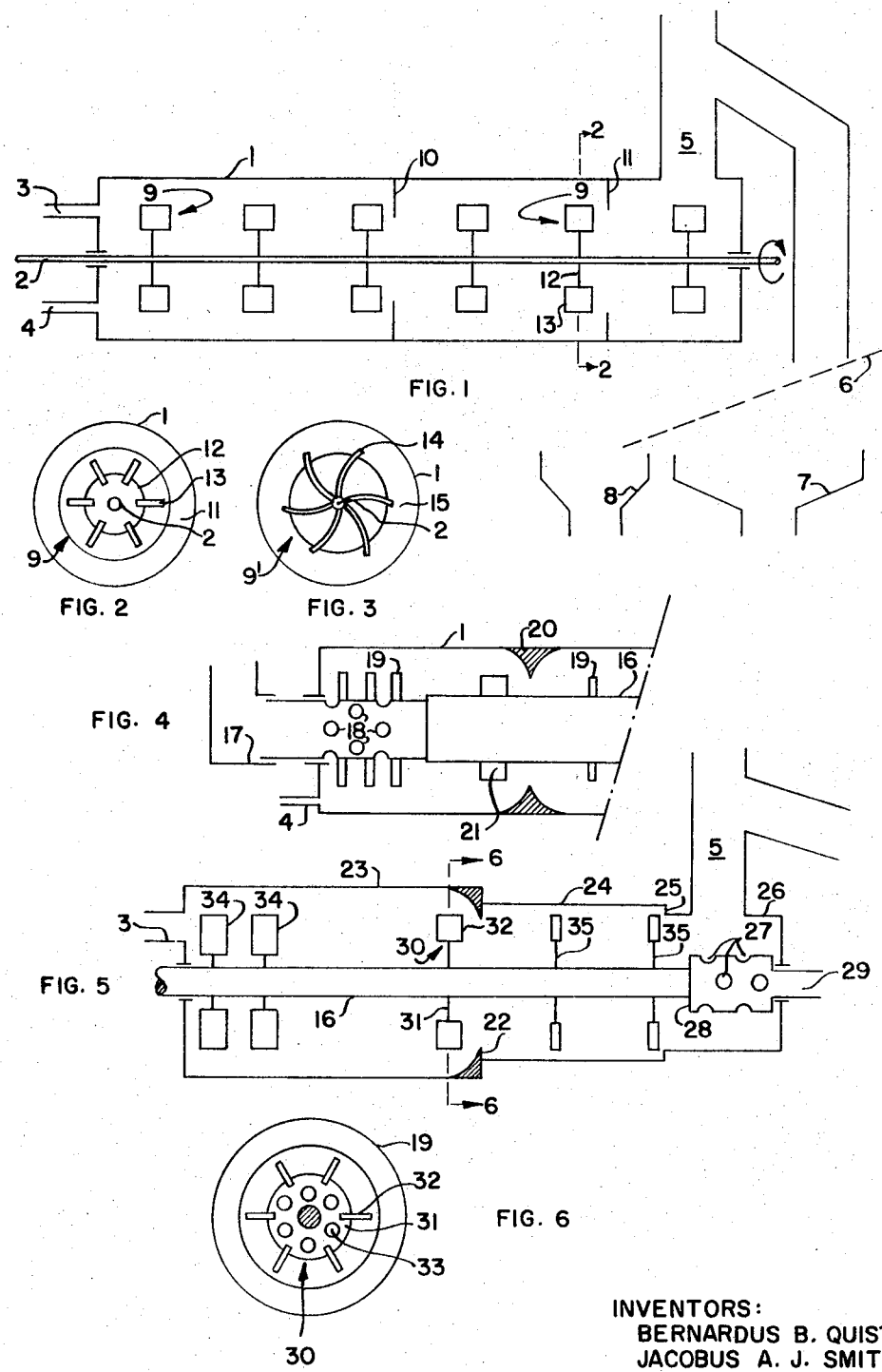

3,643,929

APPARATUS FOR THE PREPARATION OF AGGLOMERATES

BACKGROUND OF THE INVENTION

1. Field of the Invention

The invention relates to an apparatus for the preparation of agglomerates of one or more solid substances from a suspension thereof in a liquid with a density lower than that of the agglomerates, which consists of an oblong, substantially cylindrical vessel which is provided near one of the ends with a supply for suspension and, if desired, with a supply for one or more auxiliary substances, near the opposite end with a discharge for liquid and agglomerates, and with a stirring device consisting of a rotatable shaft which is in a coaxial position relative to the vessel and to which a number of stirring elements are attached.

2. Description of the Prior Art

The term "solid substances" as used in this specification is understood also to include plastic and/or deformable substances which are not liquid at the temperature prevailing in the agglomerating apparatus.

In technical practice, agglomeration of solid substances which are suspended in a liquid is frequently employed, because those substances can then be obtained in a form which permits of ready separation from the liquid. This process can be used for various purposes, for instance for obtaining the liquid or the suspended substances in the purest possible form. It is also possible to separate different solid substances present in a suspension. Often agglomeration is effected in the presence of one or more auxiliary substances, such as a binder promoting the formation of agglomerates or substances influencing the affinity of the particles of the solid substances with respect to the suspending liquid or with respect to a binder likewise added.

In carrying out the agglomeration process it is of importance that the liquid in the agglomerating apparatus should contain a large amount of agglomerates having formed already. Thus, agglomeration of incoming solid substance is promoted. It has been found that a certain concentration of agglomerates being heavier than the suspending liquid in the apparatus cannot be maintained unless special measures are taken.

SUMMARY OF THE INVENTION

The invention therefore relates to an apparatus for the preparation of agglomerates of one or more solid substances from a suspension thereof in a liquid with a density lower than that of the agglomerates, which consists of an oblong, substantially cylindrical vessel which is provided near one of the ends with a supply for suspension and, if desired, with a supply for one or more auxiliary substances, near the opposite end with a discharge for liquid and agglomerates, and with a stirring device consisting of a rotatable shaft which is in a coaxial position relative to the vessel and to which a number of stirring elements are attached, in which apparatus in the proximity of at least one but at most half of the total number of those stirring elements—and on the downstream side thereof—there is present an annular baffle which is placed perpendicular to the center line of the vessel and which fits to the wall of the vessel.

The baffles may be made of a flat plate; they should fit as tightly as possible to the wall of the apparatus, so that no liquid can flow between the wall and the baffle in the direction of the discharge. Very suitable stirring elements are the so-called turbine stirrers, where the stirring action is obtained by means of vanes placed in a circular arrangement, which vanes are parallel to the shaft.

The stirring elements transfer kinetic energy with a strong radial component to the mixture of liquid, solid substance and agglomerates. By positioning the baffles so that—viewed in the direction of flow—they are located just behind the associated stirring element it is ensured that the supply of kinetic energy to the mixture is considerably larger on the upstream side of the baffle than on the downstream side of it. Thus, on the one hand, the agglomerates in front of the baffle are conducted to the wall and near the wall are deflected in the direction of the supply, so that they remain in the section of the apparatus located before the baffle. On the other hand, in this way a pumping action in the direction of the supply is exerted on the liquid, as a result of which mixture can flow back to the section located before the baffle through the central aperture of the baffle, axial mixing of liquid between sections separated by a baffle being counteracted and the spread in the residence time of the liquid being reduced. Agglomerates which are heavier than the liquid accumulate mainly at the wall of the apparatus. Therefore, by counteracting axially directed flow along the wall the transportation of agglomerates in the direction of the discharge is prevented.

With the apparatus according to the invention larger and mechanically stronger, agglomerates can be made; if a binder is needed for the agglomeration, a smaller amount thereof will suffice. On account of the higher concentrations of agglomerates, the agglomeration process proceeds more completely and a cleaner liquid phase can be obtained; partly on account of the axial mixing being reduced in many cases a considerably larger flow of suspension can be treated in the apparatus.

If the diameter of the shaft is, for instance, 0.25-0.50 times the diameter of the apparatus, than the shaft can contribute to a large extent to the transfer of kinetic energy to the mixture.

The degree to which the agglomerate concentration in the space before a baffle is increased depends mainly on the width of that baffle and on the amount of kinetic energy supplied to the mixture by the stirring element belonging to that baffle.

In many cases, a sufficiently high concentration of agglomerates can be obtained if the width in the radial direction of the baffles is at most 25 percent of the diameter of the apparatus. In that case, sufficient space remains in the center of the apparatus for the flow of agglomerates and liquid to the discharge. If a plurality of baffles are employed, then for instance by means of a gradual decrease of the width of the baffles in the downstream direction a gradual decrease of the concentration can be obtained.

Furthermore, it is advantageous if the distance between a stirring element and an associated baffle is equal to at most twice the width of that baffle. In this way, the deflection of the agglomerates in the direction of the supply is promoted. This deflection is also influenced favorably if the corners between the baffles and the wall of the vessel are rounded off on the upstream and/or the downstream.

It may be advantageous if the stirring elements in the proximity of which there is a baffle are provided with apertures near the shaft. In this way, the flow of liquid through the apparatus is promoted. Moreover, the discharge of gas which may accumulate near the centerline of the apparatus is facilitated.

A suitable embodiment is obtained when near two stirring elements there is a baffle, by which baffles the space inside the cylindrical vessel is divided into three zones, there being at least three stirring elements in either of the two zones located on the side of the supply and at least one in the zone located on the side of the discharge. In that case in the entire apparatus a sufficiently high concentration of agglomerates can be reached, while near the supply thorough mixing with, for instance, an auxiliary substance is possible.

The diameter of the substantially cylindrical vessel may decrease, each time after a baffle, from a comparatively large value on the supply side to a comparatively small value on the discharge side, in such a way that the diameter of a section of the vessel after a baffle is not smaller than the diameter of the aperture of that baffle. In this way, it is ensured that the concentration of agglomerates which have already formed decreases in the downstream direction.

BRIEF DESCRIPTION OF THE DRAWING

FIG. 1 is a longitudinal sectional view of a preferred apparatus of the invention;

FIG. 2 is a cross-sectional view taken along the lines II—II of FIG. 1;

FIG. 3 is a cross-sectional view similar to FIG. 2 of one embodiment of the invention;

FIG. 4 is a longitudinal sectional view of another embodiment of the invention;

FIG. 5 is a longitudinal sectional view of a further embodiment of the invention; and FIG. 6 is a cross-sectional view taken along the line VI—VI of FIG. 5.

DESCRIPTION OF THE PREFERRED EMBODIMENTS

In FIG. 1, item 1 is the wall of the apparatus, item 2 the shaft, item 3 a supply for suspension, item 4 a supply for auxiliary substance and item 5 a discharge for liquid and agglomerates. By means of sieve 6, the agglomerates can be separated from the liquid. The liquid is discharged via funnel 7 and the agglomerates via funnel 8, the sieve 6 and funnels 7 and 8 being connected to the apparatus by any suitable means (not shown). On the shaft 2, a number of stirring elements 9 are disposed. After and in the proximity of two of these elements, baffles 10 and 11 are present. A cross section is shown in FIG. 2 of a stirring element 9. It consists of a disk 12 to which six flat blades 13 are attached. Baffle 11 has an aperture of which the diameter is approximately equal to the diameter of the nearby stirring element 9.

In this apparatus, baffle 11, which is located further downstream has a smaller width than baffle 10, which is located further upstream.

Another suitable embodiment of a stirring element 9' is represented in FIG. 3 wherein like numerals refer to like parts of FIG. 2. On the shaft 2 there are six curved stirring blades 14. Here baffle 15, similar to baffle 11, has an aperture of which the diameter is smaller than the diameter of the stirring element 9'.

In the apparatus according to FIG. 4, the diameter of the shaft 16 is about 40 percent of the diameter of the apparatus.

The suspension is fed to the apparatus from supply 17 and apertures 18 via the shaft 16. The supply of auxiliary substance is effected via supply 4. The shaft is provided with stirring elements 19. Before a baffle 20, stirring element 21 is placed. The corner between the baffle 20 and the wall 1 on either side of the baffle is rounded off as illustrated.

In the apparatus according to FIG. 5, the section before the baffle 22, which section is enclosed by wall 23, has a larger diameter than the section after that baffle 22, which section is enclosed by wall 24. The corner between baffle 22 and wall 23 is rounded off. Before the discharge there is a second baffle 25. On the discharge side, where the apparatus is enclosed by wall 26, the diameter of the apparatus is equal to the diameter of the aperture in baffle 25. Via apertures 27 in the chamber 28 provided on the shaft and via the hollow end 29 of the shaft 16, liquid and/or gas can be discharged. Discharge 5 serves for the discharge of liquid and agglomerates. The stirring elements 34 have larger blades than the stirring element 30. The stirring elements 35 have smaller blades than the stirring element 30.

FIG. 6 shows stirring element 30 in detail. The disk 31, on which the blades 32 are mounted, is provided with apertures 33.

EXAMPLE

Experiments were made in an apparatus of the type represented in FIG. 1; the length was 90 cm., the diameter 5 cm. Inside the apparatus two baffles were placed, at distances from the supply of 30 cm. and 75 cm., respectively. The baffles were 2.7 cm. wide. Before the first baffle there were six stirrers, between the baffles four and on the side of the discharge two. Starting from a suspension of pulverized coal with particles smaller than 0.1 mm. in cross section, using heavy fuel oil as binder, at a temperature of 50° C. hard, pellet-shaped agglomerates were obtained with a diameter of 2–5 mm. The required amount of binder was 15%w calculated on the agglomerates. The residence time of the agglomerates in the apparatus was 20 minutes, that of the liquid 6–7 minutes. The content of agglomerates of the mixture was about 40%w.

For comparison, the same experiment was made with the apparatus without the baffles. In this experiment soft agglomerates were obtained with a diameter of only ½–2 mm.; the required amount of binder was 25 percent, the residence time of both agglomerates and liquid was 20 minutes. The mixture now contained only about 10%w of agglomerates.

We claim as our invention:

1. An apparatus for the preparation of agglomerates of at least one solid substance from a suspension thereof in a liquid with a density lower than that of the agglomerates, said apparatus comprising:
    an oblong, substantially cylindrical vessel having a supply for said suspension;
    a discharge for liquid and agglomerates associated with said vessel;
    a stirring device comprising a rotatable shaft disposed in a coaxial position relative to the vessel, said shaft having a plurality of stirring elements attached thereto; and
    at least one annular baffle having a broad base abutting inside said vessel and converging to a pointed edge spaced from said rotatable shaft, disposed perpendicular to the centerline of said vessel, and adjacent on the downstream side to at least one of said elements.

2. The apparatus of claim 1 wherein the width in the radial direction of the baffles is at most 25 percent of the diameter of the vessel.

3. An apparatus for the preparation of agglomerates of at least one solid substance from a suspension thereof in a liquid with a density lower than that of the agglomerates, said apparatus comprising:
    an oblong, substantially cylindrical vessel having a supply for said suspension;
    a discharge for liquid and agglomerates associated with said vessel;
    a stirring device comprising a rotatable shaft disposed in a coaxial position relative to the vessel, said shaft having a plurality of stirring elements attached thereto; and
    at least one annular baffle abutting inside said vessel, spaced from said rotatable shaft, disposed perpendicular to the center line of said vessel, and adjacent on the downstream side to at least one of said elements, said elements having adjacent baffles being provided with apertures near the shaft.

4. An apparatus for the preparation of agglomerates of at least one solid substance from a suspension thereof in a liquid with a density lower than that of the agglomerates, said apparatus comprising:
    an oblong, substantially cylindrical vessel having a supply for said suspension;
    a discharge for liquid and agglomerates associated with said vessel;
    a stirring device comprising a rotatable shaft disposed in a coaxial position relative to the vessel, said shaft having a plurality of stirring elements attached thereto; and
    a plurality of annular baffles abutting inside said vessel, spaced from said rotatable shaft, and disposed perpendicular to the centerline of said vessel, with each baffle adjacent on the downstream side to the one of said elements, the width of the baffles gradually decreasing in the downstream direction of said vessel.

5. The apparatus of claim 4 wherein the distance between a stirring element and an associated baffle is equal to at most twice the width of that baffle.

* * * * *